(12) United States Patent
Cosby

(10) Patent No.: US 7,616,390 B1
(45) Date of Patent: Nov. 10, 2009

(54) APPARATUS AND METHOD FOR MAGNIFIER AND ILLUMINATOR FOR READING MATERIAL

(76) Inventor: Pryor E. Cosby, 154 Summerfield Dr., Foley, AL (US) 36535

( * ) Notice: Subject to any disclaimer, the term of this patent is extended or adjusted under 35 U.S.C. 154(b) by 0 days.

(21) Appl. No.: 12/284,314

(22) Filed: Sep. 22, 2008

(51) Int. Cl.
*G02B 27/02* (2006.01)
*A47B 97/04* (2006.01)
*A47B 19/00* (2006.01)

(52) U.S. Cl. .................... 359/801; 359/802; 248/444.1; 248/441.1

(58) Field of Classification Search ................. 359/801, 359/802; 248/441.1, 444.1
See application file for complete search history.

(56) References Cited

U.S. PATENT DOCUMENTS

| | | | |
|---|---|---|---|
| 1,735,949 A | 11/1929 | Brady | |
| 1,814,540 A | 7/1931 | Bander | |
| 2,087,081 A | 7/1937 | Bock | |
| 2,199,107 A | 4/1940 | Kibbe | |
| 4,120,564 A | 10/1978 | Rios | |
| 4,859,032 A | 8/1989 | Feinbloom | |
| 5,239,416 A | 8/1993 | Spitzberg | |
| 6,052,239 A * | 4/2000 | Matsui et al. | ............... 359/802 |
| 7,452,094 B1 * | 11/2008 | Kroon et al. | .................. 362/98 |
| 2002/0051304 A1 | 5/2002 | Jung | |
| 2006/0157630 A1 * | 7/2006 | Buote | ...................... 248/441.1 |
| 2007/0012849 A1 * | 1/2007 | Brady | ........................ 248/453 |

\* cited by examiner

*Primary Examiner*—Jessica T Stultz
*Assistant Examiner*—Mahidere S Sahle
(74) *Attorney, Agent, or Firm*—George L. Williamson

(57) ABSTRACT

Method and apparatus for magnifying and illuminating reading materials through the use of a plurality of magnifying lens which are adjustably placed on posts which are movable above the surface of the reading materials which materials are supported on a desk top or reading platform which is placed on the upper surface of a supporting base. The magnifying lens are supported by a series of manually and motor-driven posts which are placed on horizontal and vertical posts so that they can be moved above the surface of the reading material in an appropriate unique position which is adjustable to the requirements of the eye of the user, which user is suffering from muscular degeneration of the retina. The lens are moved by a series of screw drives which are housed in the vertical and horizontal posts. Means for lighting is adjustably supported on an arm placed above the lens so that light from the lamp can shine through the lens and onto the surface of the reading materials. The apparatus can be folded so as fit into a carrying case and may be operated by either AC or DC current.

12 Claims, 4 Drawing Sheets

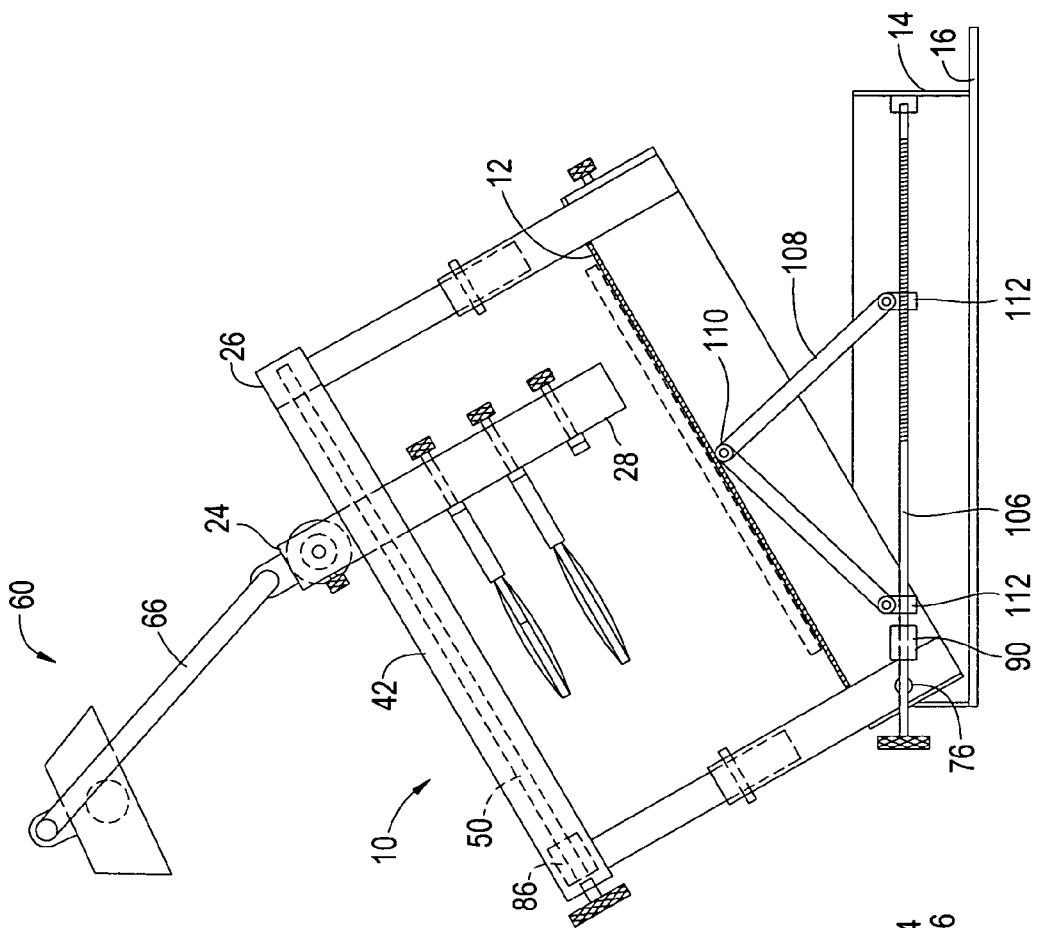
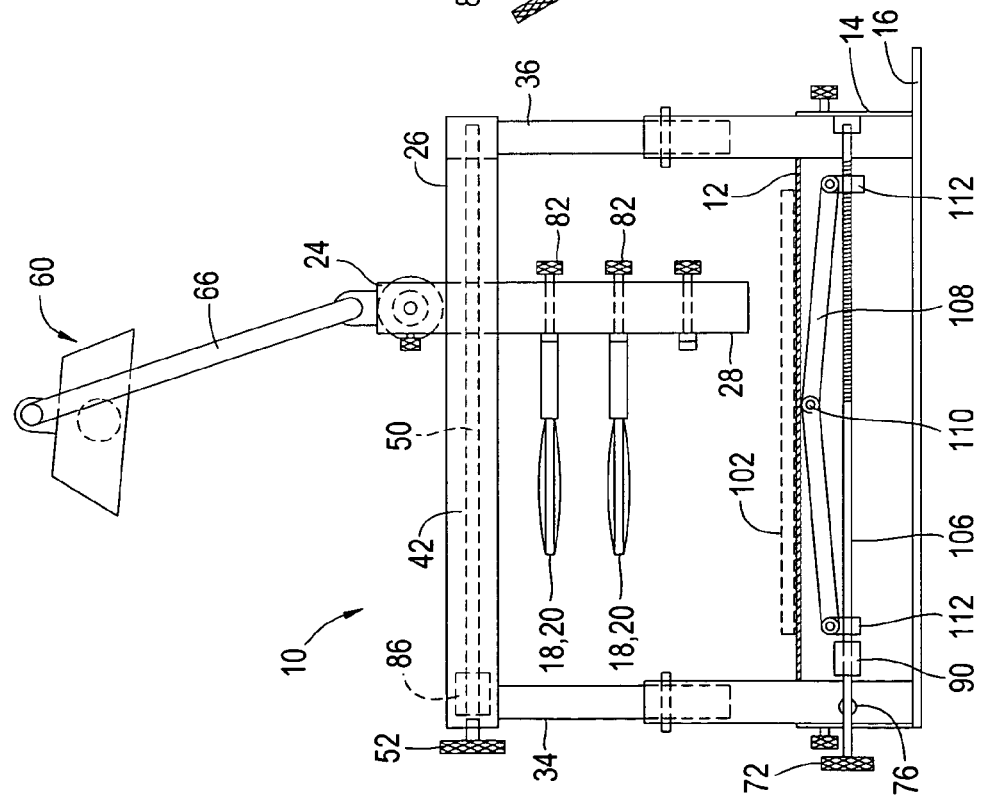

APPARATUS AND METHOD FOR MAGNIFIER AND ILLUMINATOR FOR READING MATERIAL

FIELD OF THE INVENTION

The present invention relates generally to magnifiers and, more particularly, is concerned with a magnifier and illuminator for reading materials for use by individuals with muscular degeneration of the retina.

DESCRIPTION OF THE PRIOR ART

Magnifying devices have been described in the prior art, however, none of the prior art devices disclose the unique features of the present invention.

In U.S. Pat. No. 1,814,540 dated Jul. 14, 1931, Bander disclosed a reading glass. In U.S. Patent Application Publication U.S. 2002/0051304 dated May 2, 2002, Jung disclosed an adjustable table magnifier. In U.S. Pat. No. 5,239,416 dated Aug. 25, 1993, Spitzberg disclosed a variable power zoom stand magnifier. In U.S. Pat. No. 4,859,032 dated Aug. 22, 1989, Feinbloom disclosed a handheld magnifier apparatus. In U.S. Pat. No. 4,120,564 dated Oct. 17, 1978, Rios disclosed a reading stand with magnifier. In U.S. Pat. No. 2,199,107, dated Apr. 30, 1940, Kibbe disclosed a work assisting magnifying and illuminating device. In U.S. Pat. No. 2,087,081, dated Jul. 13, 1937, Bock disclosed an optical magnifying apparatus. In U.S. Pat. No. 1,735,949 dated Nov. 19, 1929, Brady disclosed a magnifying and illuminating device.

While these magnifying devices may be suitable for the purposes for which they were designed, they would not be as suitable for the purposes of the present invention as hereinafter described.

SUMMARY OF THE PRESENT INVENTION

The present invention discloses a method and apparatus for magnifying and illuminating reading materials through the use of a plurality of magnifying lens which are adjustably placed on posts which are movable above the surface of the reading materials which materials are supported on a desk top or reading platform which is placed on the upper surface of a supporting base. The magnifying lens are supported by a series of manually and motor-driven posts which are placed on horizontal and vertical posts so that they can be moved above the surface of the reading material in an appropriate unique position which is adjustable to the requirements of the eye of the user, which user is suffering from muscular degeneration of the retina. The lens are moved by a series of screw drives which are housed in the vertical and horizontal posts. Means for effectively lighting the reading material is adjustably supported on an arm placed above the lens so that light from the lamp can shine through the lens and onto the surface of the reading materials. The present invention can be folded so as fit into a carrying case and may be operated by either AC or DC current.

An object of the present invention is to provide a device to aid the vision of persons afflicted with muscular degeneration of the retina which is a disease affecting millions of persons in the United States alone. A further object of the present invention is to provide a plurality of lens which can be utilized by a user so as to magnify and illuminate the reading materials which are placed on a desk top. A further objective of the present invention is to provide a method and apparatus for a system which can be easily used by a person having muscular degeneration of the retina or similar eyesight problems. A further object of the present invention is to provide a device which can be simply and relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIGS. 3-4 are cross-sectional views of the present invention.

LIST OF REFERENCE NUMERALS

Figure 1:
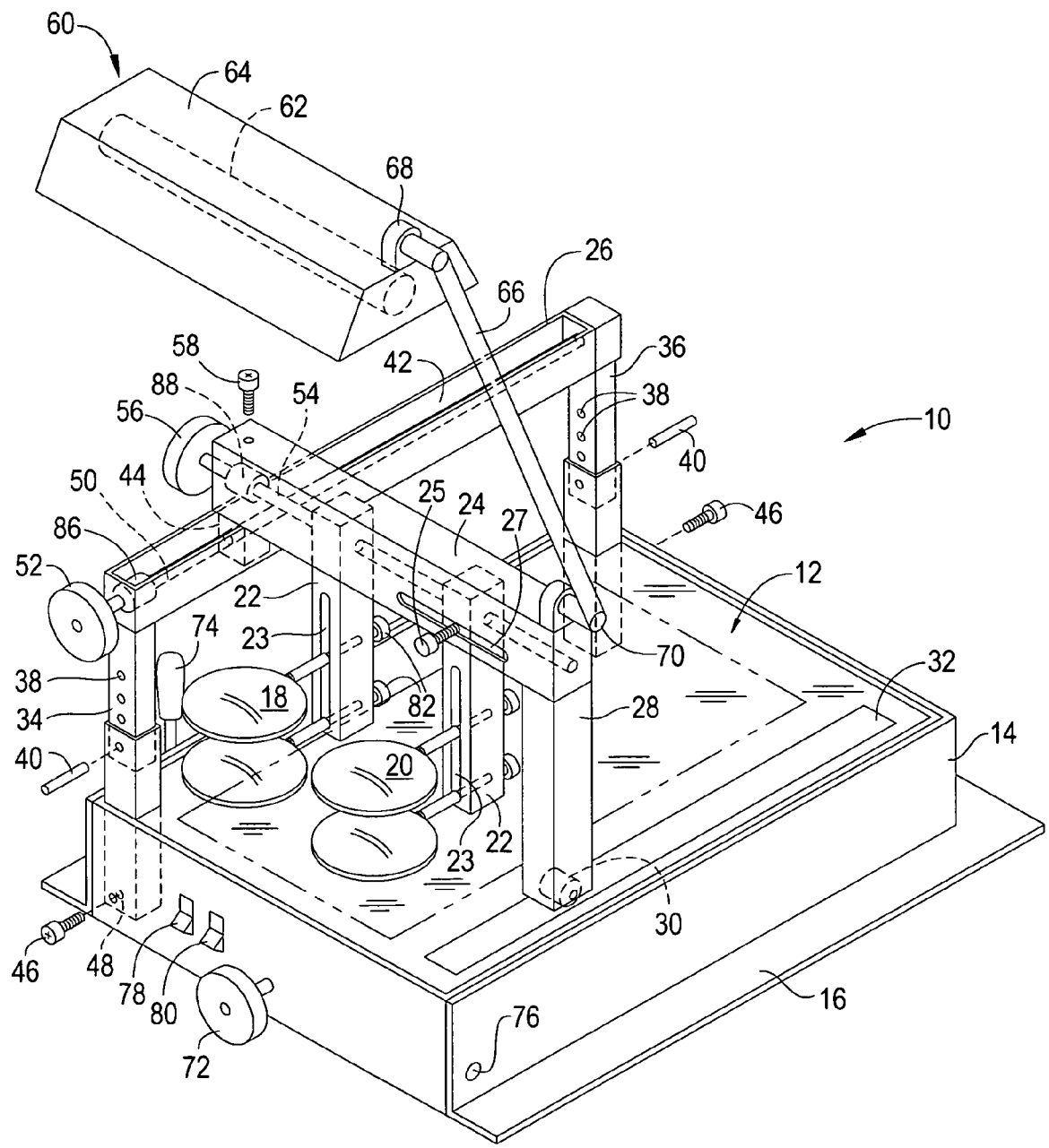
FIG. 1 is a perspective view of the present invention.

With regard to reference numerals used, the following numbering is used throughout the drawings.

10 present invention
11 user
12 desk top
13 eye
14 support base
16 support flange
18 left lens
20 right lens
22 vertical lens post
23 slot
24 cross post
25 adjustment screw
26 horizontal member
27 slot
28 end support
30 roller
32 track
34 first vertical post
36 second vertical post
38 apertures
40 pin
42 track
44 support member
46 fastener
48 aperture
50 first screw drive
52 knob
54 second screw drive
56 knob
58 fastener
60 light
62 bulb 64 housing
66 support arm
68 rotatable pivot
70 rotatable pivot
72 control knob
74 joystick
76 pivot
78 first power switch
80 second power switch
82 lens fastener
84 controller
86 Y axis motor
88 X axis motor
90 platform tilt motor
92 AC/DC converter
94 AC power supply
96 switch
98 switch
100 switch
102 reading materials
104 support member
106 screw drive
108 scissors lift
110 pivotal connector
112 threaded pivotal connector

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 show the present invention wherein a device for magnifying and illuminating reading materials is disclosed.

Turning to FIG. 1, shown therein is the present invention 10 having a desk top 12 upon which may be placed reading materials, such as books, magazines and/or pages of paper, which desk top is supported by a support base 14 having a support flange 16 disposed about its bottom side and extending laterally therefrom so as to provide support to the present invention. The desk top has an upper and lower end and a left and right side which will be defined in the following discussion. A plurality of lens are supported on a downwardly extending lens post 22 wherein there is a left set of lens 18 and a right set of lens 20 which may include an upper and lower lens mounted onto the corresponding lens post so that each of the left and right eyes of the user has a dedicated set of lens 18, 20 in order to correct the independent eyesight which is unique to each eye of the user. The lens 18, 20 are supported on an independent vertical lens post 22 which lens post are downwardly disposed from a cross post 24 having first and second ends wherein one end operates in a track 42 of a horizontal member 26 and the second end is supported by a right end support post 28 having a roller 30 on its lower end which roller operates in track 32 disposed on the upper surface of the desk top 12. The left end of the cross port 24 is generally supported by a horizontal member 26 which is supported by a first and second vertical support post 34 on the lower end and 36 on the upper end of desk top 12 which posts are vertically height adjustable so as to be telescoping utilizing a plurality of apertures 38 and a retractable pin 40 so that the vertical posts can be raised and lowered and removable for folding the present invention 10. The horizontal member 26 has a track 42 therein which receives a downwardly disposed support member 44 disposed on the left end of cross post 24 so that the downwardly disposed member 44 can move from a first, lower end of the desk top 12 to the second, upper end of the desk top in the track 42. Note that the vertical support posts 34, 36 are removably disposed in the support base 14 by means of a threaded fastener 46 insertable in aperture 48 as would be done in the standard manner by one skilled in the art. This allows the vertical posts 34, 36 to be removed from the support base 14 for storage. A first screw drive 50 having a screw drive knob 52 thereon is disposed in the track 42 of horizontal member 26 in which the downwardly disposed support member 44 moves up and down the desk top 12. A second screw drive 54 having a knob 56 thereon is disposed in the cross post 24 so that the lens post 22 can be moved from left to right across the surface of the reading material on the surface of the desk top 12. Note that fastener 58 is threadably disposed in the cross post 24 for connecting the cross member to the support member 44 so that the cross post 24 can be removed and separated from the support member 44 and the horizontal member 26 so that the cross post can be more conveniently stored. Also shown is a light 60 having a bulb or light emitting diode (LED) 62 mounted in a housing 64 which housing is disposed on the upper end of a support arm 66 so that the housing has a rotatable pivot member 68 on its upper end and a rotatable pivot member 70 on its lower end so that the light can be easily adjustable in all directions so as to properly illuminate the reading material placed on the desk top 12. Also shown is a control knob 72 which is used for a screw drive (not shown but see FIGS. 3 and 4) which is used to elevate the desk top 12 which will be disclosed later. Also shown is a joystick 74 used for multi-directional control of the present invention 10 which will be later described. Also shown is the end of a pivot member 76 which is used to raise the upper end of the desk top 12 on the support base 14 which will be later described. Also shown are first and second power switches 78, 80. Also shown are a plurality of lens mounting fasteners 82 having one associated with each lens set 18, 20 so that the lens can be quickly and easily attached to and removed from the lens post 22 and can be independently height adjusted according to the visual power of the user by being moved in slot 23 as would be done in the standard manner by one skilled in the art. The horizontal distance between the right and left post 22 can be varied by using adjustment screw 25 to allow the corresponding post 22 to be moved along screw drive 54 in slot 27 as would be done in the standard manner by one skilled in the art.

Figure 2:
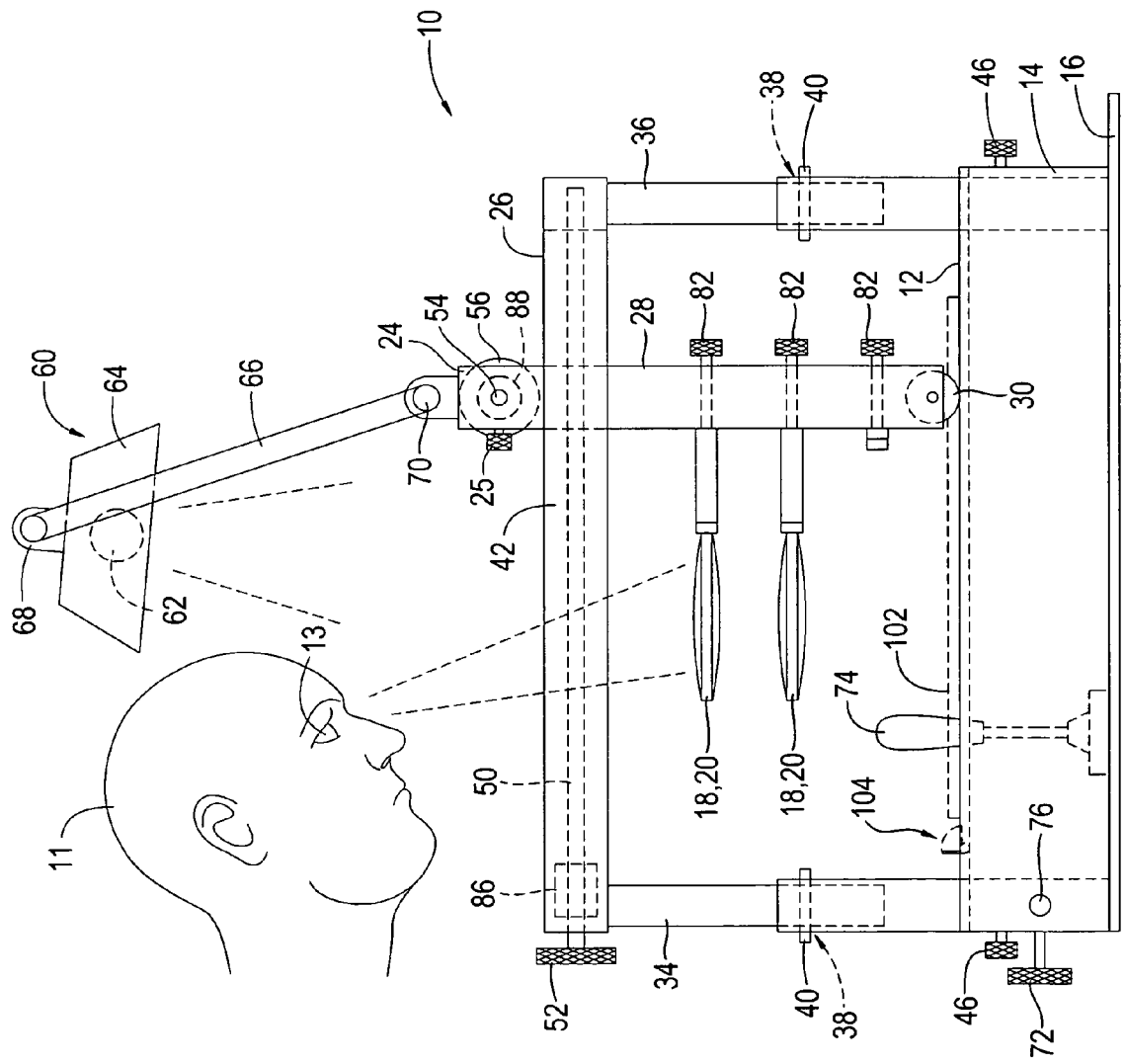
FIG. 2 is a side elevation view of the present invention.

Turning to FIG. 2, shown therein is the present invention 10 having a desk top 12 upon which may be placed reading materials 102, such as books, magazines and/or pages of paper, which desk top is supported by a support base 14 having a support flange 16 disposed about its bottom side and extending laterally therefrom so as to provide support to the present invention. A plurality of lens are supported on a downwardly extending lens post 22 wherein there is a left lens 18 and a right lens 20 which may include an upper and lower lens mounted onto the corresponding lens post so that each of the left and right eyes of the user 11 has a dedicated set of lens 18, 20 in order to correct the independent eyesight which is unique to each eye 13 of the user. The lens 18, 20 are supported on an independent vertical lens post (not visible) which lens post are downwardly disposed from a cross post 24 having first and second ends wherein one end operates in a track 42 of a horizontal member 26 and the second end is supported by an end support post 28 having a roller 30 on its lower end which roller operates in track (not visible) disposed on the upper surface of the desk top 12. The left end of the cross post 24 is generally supported by a horizontal member 26 which is supported by a first and second vertical support post 34, 36 on each end thereof which posts are vertically height adjustable so as to be telescoping utilizing a plurality of apertures 38 and a retractable pin 40 so that the vertical posts can be raised and lowered and removable for folding the present invention 10. The horizontal member 26 has a track 42 therein which receives a downwardly disposed support member 44 (not visible) disposed on the left end of cross post 24 so that the downwardly disposed member can move from a first, lower end of the desk top 12 to the second, upper end of the desk top in the track 42. Note that the vertical support posts 34, 36 are removably disposed in the support base 14 by means of a threaded fastener 46 insertable in aperture (not visible) as would be done in the standard manner by one skilled in the art. This allows the vertical posts 34, 36 to be removed from the support base 14 for storage. A first screw drive 50 having a screw drive knob 52 thereon and a Y-axis drive motor 86 is disposed in the track 42 of horizontal member 26 in which the downwardly disposed support member moves up and down the desk top 12. A second screw drive 54 having a knob 56 thereon and an X-axis drive motor 88 is disposed on the cross post 24 so that the lens post can be moved from left to right across the surface of the reading material on the surface of the desk top 12. Note that fastener 58 is threadably disposed in the cross port 24 for connecting the cross member to the support member so that the cross post 24 can be removed and separated from the support member and the horizontal member 26 so that the cross post can be more conveniently stored. Also shown is a light 60 having a bulb 62 mounted in a housing 64 which housing is disposed on the upper end of a support arm 66 so that the housing has a rotatable pivot member 68 on its upper end and a rotatable pivot member 70 on its lower end so that the light can be easily adjustable in all directions so as to properly illuminate the reading material placed on the desk top 12. Also shown is a control knob 72 which is used for a screw drive (not shown but see FIGS. 3 and 4) which is used to elevate the desk top 12 which will be disclosed later. Also shown is a joystick 74 used for multi-directional control of the present invention 10 which will be later described. Also shown is the end of a pivot member 76 which is used to raise the desk top 12 on the support base 14 which will be later described. Also shown are a plurality of lens mounting fasteners 82 having one associated with each lens 18, 20 so that the lens can be quickly and easily attached to and removed from the lens post.

Turning to FIGS. 3-4, shown therein is the present invention 10 having a desk top 12 upon which may be placed reading materials 102, such as books, magazines and/or pages of paper, which desk top is supported by a support base 14 having a support flange 16 disposed about its bottom side and extending laterally therefrom so as to provide support to the present invention. A plurality of lens are supported on a downwardly extending lens post 22 wherein there is a left lens 18 and a right lens 20 which may include an upper and lower lens mounted onto the corresponding lens post so that each of the left and right eyes of the user has a dedicated set of lens 18, 20 in order to correct the independent eyesight which is unique to each eye of the user. The lens 18, 20 are supported on an independent vertical lens post (not visible) which lens post are downwardly disposed from a cross post 24 having first and second ends wherein one end operates in a track 42 of a horizontal member 26 and the second end is supported by an end support post 28 having a roller 30 on its lower end which roller operates in track (not visible) disposed on the upper surface of the desk top 12. The left end of the cross post 24 is generally supported by a horizontal member 26 which is supported by a first and second vertical support post 34, 36 on each end thereof which posts are vertically height adjustable so as to be telescoping utilizing a plurality of apertures 38 and a retractable pin 40 so that the vertical posts can be raised and lowered and removable for folding the present invention 10. The horizontal member 26 has a track 42 therein which receives a downwardly disposed support member 44 (not visible) disposed on the left end of cross post 24 so that the downwardly disposed member can move from a first, lower end of the desk top 12 to the second, upper end of the desk top in the track 42. Note that the vertical support posts 34, 36 are removably disposed in the support base 14 by means of a threaded fastener 46 insertable in aperture (not visible) as would be done in the standard manner by one skilled in the art. This allows the vertical posts 34, 36 to be removed from the support base 14 for storage. A first screw drive 50 having a screw drive knob 52 thereon and a Y-axis drive motor 86 is disposed in the track 42 of horizontal member 26 in which the downwardly disposed support member moves up and down the desk top 12. A second screw drive 54 having a knob 56 thereon and X-axis drive motor 88 is disposed on the cross post 24 so that the lens post can be moved from left to right across the surface of the reading material on the surface of the desk top 12. Note that fastener 58 is threadably disposed in the cross post 24 for connecting the cross member to the support member so that the cross post 24 can be removed and separated from the support member and the horizontal member 26 so that the cross post can be move conveniently stored. Also shown is a light 60 having a bulb 62 mounted in a housing 64 which housing is disposed on the upper end of a support arm 66 so that the housing has a rotatable pivot member 68 on its upper end and a rotatable pivot member 70 on its lower end so that the light can be easily adjustable in all directions so as to properly illuminate the reading material placed on the desk top 12. Also shown is a screw drive knob 72 which is used for a third screw drive 106 and a platform tilt drive motor 90 which is used to elevate the desk top 12 by means of a scissors lift 108 having a pair of support legs pivotally connected at 110 to the underside of platform 12 and threadably pivotally connected at 112 to screw drive 106 so that when screw drive 106 is turned platform 12 is either raised or lowered. Also shown is a joystick 74 used for multi-directional control of the present invention 10 which will be later described. Also shown is the end of a pivot member 76 which is used to raise the desk top 12 on the support base 14. Also shown are a plurality of lens mounting fasteners 82 having one associated with each lens 18, 20 so that the lens can be quickly and easily attached to and removed from the lens post.

Figure 5:
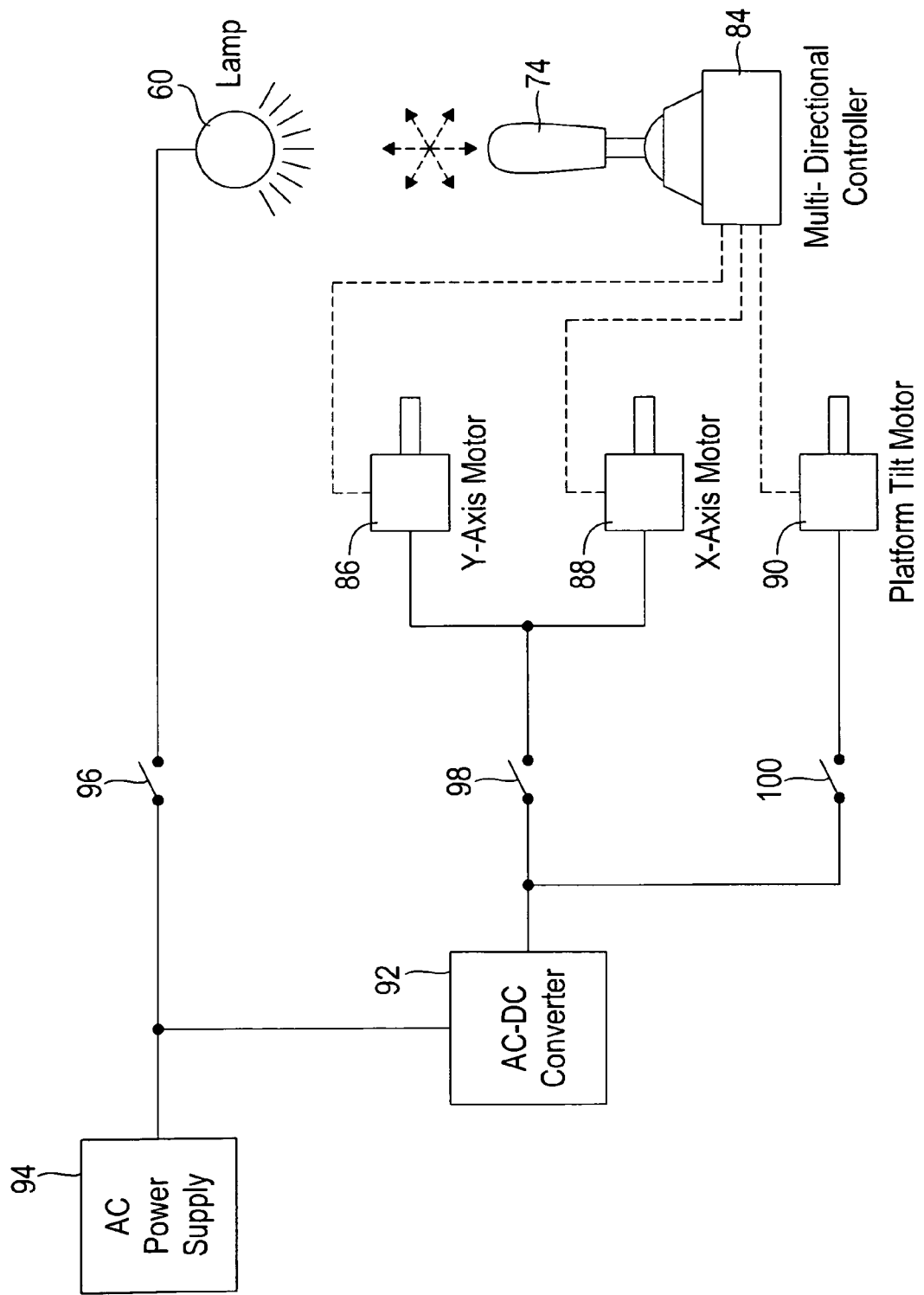
FIG. 5 is an electrical schematic of the present invention.

Turning to FIG. 5, therein is shown an exemplary electrical schematic for the present invention showing the lamp 60 along with a multidirectional controller 84 having a joystick 74 thereon for controlling the operation of the drive motors of the present invention. Shown are a Y axis motor 86, an X axis motor 88, and platform tilt motor 90 along an AC/DC converter 92 and an AC power supply 94. Switches 96, 98, 100 are also shown.

In summary, the present invention 10 provides a method and apparatus for magnifying and illuminating reading materials 102 so that the reading materials can be brought into focus and read by a user 11 having impaired vision, comprising; a) a base 14 for supporting the apparatus; b) a desk top 12 being disposed on the base for supporting the reading materials, the desk top having upper and lower ends, left and right sides, and an underside; c) a left 18 and right 20 set of magnifying lens being disposed above the reading materials to permit a user to focus on the reading materials through the lens; d) means for supporting said left and right set of magnifying lens including at a minimum elements 22, 24, 28, 82 (other elements may also be involved), whereby each set of lens is independently vertically adjustable according to the visual power of the user, and, whereby each set of lens is independently horizontally adjustable according to the distance between the eyes of the user; e) means for moving said left and right set of magnifying lens from said upper to said lower end of said desk top including at a minimum elements 26, 34, 36, 50, 86 (other elements may also be involved), whereby the reading materials remain in proper focus with the eyes of the user; f) means for moving said left and right set of magnifying lens from said left side to said right side of said desk top including at a minimum elements 24, 28, 54, 88 (other elements may also be involved), whereby the reading materials remain in proper focus with the eyes of the user; g) means for raising said upper end of said desk top including at a minimum elements 106, 108, 110, 90 (other elements may also be involved), whereby the reading materials remain in focus with the eyes of the user; and, h) means for illuminating said desk top including at a minimum elements 60, 62 (other elements may also be involved), whereby the reading materials are effectively illuminated to allow a user with impaired vision to read the reading materials.

I claim:

1. An apparatus for magnifying and illuminating reading materials so that the reading materials can be brought into focus and read by a user having impaired vision, comprising:
    a) a base for supporting the apparatus;
    b) a desk top being disposed on said base for supporting the reading materials, said desk top having upper and lower ends, left and right sides, and an underside;
    c) a left and right set of magnifying lens being disposed above the reading materials to permit a user to focus on the reading materials through the lens;
    d) means for supporting said left and right set of magnifying lens, whereby each said set of lens is independently vertically adjustable according to the visual power of the user, and, whereby each said set of lens is independently horizontally adjustable according to the distance between the eyes of the user;
    e) means for moving said left and right set of magnifying lens from said upper to said lower end of said desk top, whereby the reading materials remain in proper focus with the eyes of the user;
    f) means for moving said left and right set of magnifying lens from said left side to said right side of said desk top, whereby the reading materials remain in proper focus with the eyes of the user;
    g) means for raising said upper end of said desk top, whereby the reading materials remain in focus with the eyes of the user;
    h) means for illuminating said desk top, whereby the reading materials are effectively illuminated to allow a user with impaired vision to read the reading materials;
    i) wherein said means for supporting said left and right set of magnifying lens further comprises a cross post extending substantially from said left to said right sides of said desk top;
    j) a left and right lens post being downwardly disposed from said cross post; and,
    k) wherein said left set of magnifying lens is disposed on said left lens post and said right set of magnifying lens is disposed on said right lens post.

2. The apparatus of claim 1, wherein said means for moving said left and right set of magnifying lens from said upper to said lower end of said desk top further comprises:
    a) a horizontal member extending substantially from said upper end to said lower end of said desk top, said horizontal member having a first and a second end; and,
    b) a vertical post being disposed on each said first and second end of said horizontal member so that said horizontal member is removably attached to said desk top.

3. The apparatus of claim 2, further comprising a first screw drive being disposed in said horizontal member whereby said cross post can be moved from said lower to said upper end of said desk top.

4. The apparatus of claim 3, wherein said means for moving said left and right set of magnifying lens from said left side to said right side of said desk top further comprises a second screw drive being disposed in said cross member whereby said left and right lens post can be moved from said left side to said right side of said desk top.

5. The apparatus of claim 4, wherein said means for raising said upper end of said desk top further comprises:
    a) a third screw drive disposed underneath said desk top; and
    b) a scissors lift adapted for connection to said underside of said desk top and said third screw drive so that said upper end of said desk top is raised when said third screw drive is turned.

6. The apparatus of claim 5, further comprising a first, second and third electrical motor for operating each of said first, said second and said third screw drives.

7. A method for magnifying and illuminating reading materials so that the reading materials can be brought into focus and read by a user having impaired vision, comprising the steps of:
    a) providing a base for supporting the method;
    b) providing a desk top being on the base for supporting the reading materials, the desk top having upper and lower ends, left and right sides, and an underside;
    c) providing a left and right set of magnifying lens above the reading materials to permit a user to focus on the reading materials through the lens;
    d) supporting the left and right set of magnifying lens, whereby each set of lens is independently vertically adjustable according to the visual power of the user, and, whereby each set of lens is independently horizontally adjustable according to the distance between the eyes of the user;
    e) moving the left and right set of magnifying lens from the upper to the lower end of the desk top, whereby the reading materials remain in proper focus with the eyes of the user;
    f) moving the left and right set of magnifying lens from the left side to the right side of the desk top whereby the reading materials remain in proper focus with the eyes of the user;
    g) raising the upper end of the desk top whereby the reading materials remain in focus with the eyes of the user;
    h) illuminating the desk top whereby the reading materials are effectively illuminated to allow a user with impaired vision to read the reading materials;
    i) wherein supporting the left and right set of magnifying lens further comprises the step of providing a cross post extending substantially from the left to the right sides of the desk top;
    j) providing a left and right lens post being downwardly disposed from the cross post; and,
    k) wherein the left set of magnifying lens is disposed on the left lens post and the right set of magnifying lens is disposed on the right lens post.

8. The method of claim 7, wherein moving the left and right set of magnifying lens from the upper to the lower end of the desk top further comprises the steps of:
   a) providing a horizontal member extending substantially from the upper end to the lower end of the desk top, the horizontal member having a first and a second end; and,
   b) providing a vertical post on each of the first and second ends of the horizontal member so that the horizontal member is removably attached to the desk top;

9. The method of claim 8, further comprising the steps of providing a first screw drive in the horizontal member whereby the cross post can be moved from the lower to the upper end of the desk top.

10. The method of claim 9, wherein moving the left and right set of magnifying lens from the left side to the right side of the desk top further comprises the steps of providing a second screw drive in the cross member whereby the left and right lens post can be moved from the left side to the right side of the desk top.

11. The method of claim 10, wherein raising the upper end of the desk top further comprises the steps of:
   a) providing a third screw drive disposed underneath the desk top; and,
   b) providing a scissors lift adapted for connection to the underside of the desk top and the third screw drive so that the upper end of the desk top is raised when the third screw drive is turned.

12. The method of claim 11, further comprising the steps of providing a first, second and third electrical motor for operating each of the first, the second and the third screw drives.

* * * * *